United States Patent [19]

Dugdale

[11] Patent Number: 5,048,074
[45] Date of Patent: Sep. 10, 1991

[54] ELECTRONIC APPARATUS FOR "HANDS OFF" CONTROL OF A VOICE MAIL SYSTEM

[76] Inventor: William P. Dugdale, 4450 E. 56th St., Indianapolis, Ind. 46220

[21] Appl. No.: 388,011

[22] Filed: Jul. 31, 1989

[51] Int. Cl.⁵ .................. H04M 1/00; H04M 3/50
[52] U.S. Cl. ................................ 379/67; 379/89; 379/360; 379/442
[58] Field of Search ............... 379/89, 88, 67, 75, 379/69, 360, 361, 442; 369/25, 29, 28

[56] References Cited

U.S. PATENT DOCUMENTS

| | | | |
|---|---|---|---|
| 3,895,189 | 7/1975 | Matz | 379/75 |
| 4,371,752 | 2/1983 | Matthews et al. | 379/89 |
| 4,468,751 | 8/1984 | Plunkett, Jr. | 364/900 |
| 4,488,274 | 12/1984 | Plunkett, Jr. | 369/24 |
| 4,640,991 | 2/1987 | Matthews et al. | 379/88 |
| 4,658,097 | 4/1987 | D'Agosto et al. | 379/75 |
| 4,677,658 | 6/1987 | Kolodny et al. | 379/75 |
| 4,719,647 | 1/1988 | Theis et al. | 379/68 |
| 4,761,807 | 8/1988 | Matthews et al. | 379/89 |
| 4,860,339 | 8/1989 | D'Agosto et al. | 379/67 |

Primary Examiner—Thomas W. Brown
Attorney, Agent, or Firm—Woodard, Emhardt, Naughton Moriarty & McNett

[57] ABSTRACT

An apparatus for "hands off" control of a Voice Mail System over a telephone line by a user to allow the user to simultaneously perform other functions such as manually processing the "oral mail" to take notes, do data entry or the like. The apparatus includes a foot pedal that is wired with switches. The foot pedal switches are connected through an interface circuit to a DTMF tone generator or a generator of digital signals corresponding to VMS functions. The interconnection is such that depending upon the pedal activated a different tone or digital signal will be generated. The user can readily reconnect the interface to vary the signal to pedal correspondence for changes in Voice Mail Systems or to implement other Voice Mail System commands. The DTMF tone generator is connected in series between the hand set and base set of a telephone so that system can be readily connected to an existing telephone and so that the tones can be sent over the phone line to a Voice Mail System.

13 Claims, 3 Drawing Sheets

ELECTRONIC APPARATUS FOR "HANDS OFF" CONTROL OF A VOICE MAIL SYSTEM

BACKGROUND OF THE INVENTION

1. Field of the Invention

The field of this invention is Voice Mail Systems and the manual processing of messages stored in a Voice Mail System, and more particularly the remote control of a Voice Mail System by an apparatus that allows the user to both remote control the Voice Mail System while making practical for the user to manually process and/or listen to messages stored in a Voice Mail System.

2. Background of the Prior Art

Voice Mail Systems (hereinafter "VMS") are a powerful communications tool in the business world. Essentially, a VMS is an invention which mates telephone and computer technology to create a system of "oral mail" over the phone lines that is analogous to and often more powerful than the standard "written mail" system. A user of a VMS can use their telephone to call the VMS and leave oral messages as "oral mail." The VMS retains the "oral mail" in a computer memory. Among other things, the user can then instruct the VMS through a telephone to deliver the "oral mail" through telephone lines to one or more intended recipients.

The following U.S. Patents generally describe some of the features and attributes that are available in and that constitute a Voice Mail System: U.S. Pat. No. 4,371,752 to Matthews et al. issued in 1983; U.S. Pat. No. 4,640,991 to Matthews et al. issued in 1987; and U.S. Pat. No. 4,761,807 to Matthews et al. issued in 1988. As shown in U.S. Pat. No. 4,371,752 a VMS can have, among others, the following attributes (1) Subscribers within the system can deposit a verbal message by using their telephone to call a "central telephone office" to deposit the "oral mail" in computer memory and select the addressees to receive the message; (2) The user depositing a message in the system may provide the system through their telephone with a number of addresses for automatic delivery of the stored message without requiring any further time by the user sending the message; (3) The system may require the user to enter an authorization code through their telephone which is checked for validity prior to accessing the message deposit function of the system; (4) After receipt of each message, the recipient is provided with means to instruct the system over their telephone to redirect the message, reply to the message by depositing a message of his own, store the message in a verbal file folder, acknowledge message receipt or save the message for a predetermined period of time; (5) The system also enables the user to use their telephone to control the retention and playback of the "oral mail" voice messages.

Typically, the features of a VMS are controlled by executing a sequence of Dual Tone Multifrequency (hereinafter referred to as DTMF) signals from a "Touch tone" type telephone. Each VMS is designed by its manufacturer to be controlled by varying sequences of DTMF signals from the user. For example, a sequence of tones and pauses might start playing a message, skip back 10 seconds, skip back to the beginning, skip forward 10 seconds, skip back to the beginning, skip forward 10 seconds, skip forward to the end of the message, or stop playing a message. Each manufacturer assigns its own communications standards which relate which touch tone signals or DTMF signals correspond to which functions of the VMS. Subscribers are provided with the proper dictionary of signals to function. VMS are thus a very useful means of conveying and retaining oral information. Moreover, much of the intent and focus of VMS is to remove the need for the generation of documents for the purpose of communication with others.

In practical application of VMS users often wish to manually process all of the "oral mail" or some of the information conveyed in the "oral mail" into a written document. Typically, this manual processing is accomplished by a person having the responsibility of listening to the VMS "oral mail" and then preparing a written document or other notation. Among, but not limited to, the forms of manual processing are data entry into a computer, shorthand, note taking, filling out of forms based upon the information in the oral mail, and/or word processing. Because control of the VMS is accomplished through the touch tone keypad of a telephone, the user would have to manually shift back and forth from their manual processing of the information, such as data entry into a computer's keyboard, to the telephone pad in order to accomplish their task. Such manual transferring back and forth is cumbersome, inefficient and can result in error. Pressing the appropriate button of the telephone keypad is even more cumbersome for a user who is simultaneously trying to perform some other task requiring the use of their hands.

The present invention provides a solution whereby the user can control the VMS with a "hands off" control of the plurality of features available from a VMS, while at the same time processing the "oral mail." The applicant is of the belief that he is the first to design a system that allows such "hands off" control of the particular features of a VMS while allowing the user to perform other manual tasks for processing the information in the VMS's "oral mail."

U.S. Pat. No. 4,677,658 to Kolodny et al. issued in 1987, illustrates a telephone handset which has five buttons on the back and sides of the handset. The buttons of Kolodny correspond to the "record," "playback," "forward," and "rewind," functions that are part of a dictation machine. Kolodny discloses that the buttons are intended to be on the telephone handset so that the user can make a phone call to a remote dictation machine and perform the function of giving dictation. Kolodny does not solve the problem of unencumbering manual processing of VMS "oral mail." Kolodny does not even discuss VMS. With Kolodny the operator must still use their hands to control the push buttons that emit the tone bursts and simultaneously attempt transcription of standard dictation. Kolodny thus teaches away from a "hands off" control of VMS.

U.S. Pat. No. 4,658,097 to D'Agosto III et al., issued in 1987 and assigned to Dictaphone Corporation, discloses the use of a foot pedal with a telephone to remotely control a specific dictation apparatus through specific DTMF tone signals transmitted into the telephone by pressing the foot pedal to control the normal "dictation" functions associated with analog tape dictation equipment of "playback," "fast-forward" and "rewind." The playback of "oral mail" in a VMS system is digital and therefore will have features such as "skip back to the beginning," "skip back" a defined amount, "skip forward" a defined amount, or simultaneously play the "oral mail" to more than one location. The features of a VMS are thus different from a standard dictation machine.

The dictation technology of D'Agosto III is designed for use with the standard dictation machines that respond to the few simple and predetermined tones needed for dictation, a tone for playback, a tone for rewind, and a tone for fast-forward. D'Agosto III thus discloses the hard wiring of one digit tones through the foot pedal that are compatible with a standard dictation machine's functions. D'Agosto does not discuss VMS or indicate that its technology should be used to control the functions of a VMS instead of a dictation machine.

In a VMS, the required number of ordered tones necessary to invoke a particular function varies from one manufacturer to another. Also, some systems allow the user to define their own "menu" of tone prompts for particular purposes, such as polling surveys. In any case there is a plurality of tones, tone order, and pauses between tones that are necessary to actuate the plurality of voice message system functions available from any of the several voice message systems in use today. The one digit control of D'Agosto III directly associated with the functions of a normal dictation machine do not directly address the tone control requirements of VMS. D'Agosto does not directly mention or suggest that it is usable with VMS. Further, prior to the present invention, a "hands off" system for manual processing of VMS "oral mail" did not exist to the applicant's knowledge despite the existence of the disclosure of D'Agosto III.

SUMMARY OF THE INVENTION

The present invention provides an apparatus for remote "hands off" control of the message delivery or other functions of a Voice Mail System (VMS) for the simultaneous manual processing of the "oral mail" of a VMS. The present invention is a foot pedal (or other "hands off" switching) controlled DTMF tone generating device which is placed in series with a telephone set and telephone handset; thereby allowing the user to control a locally or remotely located VMS by depressing foot pedal switches that transmit control DTMF tones into the telephone line to be received by the VMS; where those tones correspond to the appropriate corresponding VMS functions.

In the preferred embodiment of the present invention the user issues the particular tones over a telephone line necessary to control a remote VMS by selecting one of three foot pedal switches. Each of the three foot pedal switches is definable by the user to emit any of the 12 DTMF tones that will correspond to the particular VMS to which the user has subscribed. The present invention provides the user with "hands off" control of a VMS through control of, which pedal relates to which tone, which tones are transmitted, the order of the tones, and the pauses between tones.

The invention also provides the user with control of many of the varied VMS functions and attributes allowing greater usage and versatility of VMS's. With the present invention the user is able to control the VMS with "hands off" operation while the user is also conveying oral mail with the message deposit function, manually processing with the message delivery function, accessing voice database information employing the user changeable group codes function, responding to an interactive voice message query to enter routing sales information, purchase orders, etc., from the Interactive Voice Response (IVR) function, accessing a particular list from a voice database employing the User Changeable Group Codes Function, or interacting with any of the many other features available from a commercial VMS.

The preferred embodiment of the present invention is coupled to the telephone between the telephone handset and the telephone set. The "tip" and "ring" of the telephone line is readily accessed for foot pedal transmission of DTMF control tones. With this coupling location, the user also receives stored voice transmissions from the voice message system or transmit voice messages to the voice message system through the user's telephone handset. Moreover, this coupling location enables the preferred embodiment of the present invention to connect to most standard telephone sets that are already in place.

The preferred embodiment of the present invention provides a means for a user to readily reconfigure each foot pedal switch to a chosen DTMF tone. Different VMS systems will have different tone to function correlations. With the present invention the user is able to reconfigure the apparatus to change from one VMS to another VMS with different tone to function correlations. Also a user may wish to control different VMS functions in a "hands off" manner at different times. The user will reconfigure the foot pedal switches to control other features on the same VMS or a different VMS with dissimilar control tones by assigning the different foot pedal switches to different tones.

Some of the objects and advantages of the present invention have been discussed above. Other objects and advantages of the present invention are discernable from the description of the preferred embodiment that follows.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such equivalents, alterations and further modifications to the illustrated device, and such further applications of the principles of the invention as illustrated therein being contemplated as would normally occur to one skilled in the art to which the invention relates.

Figure 1:
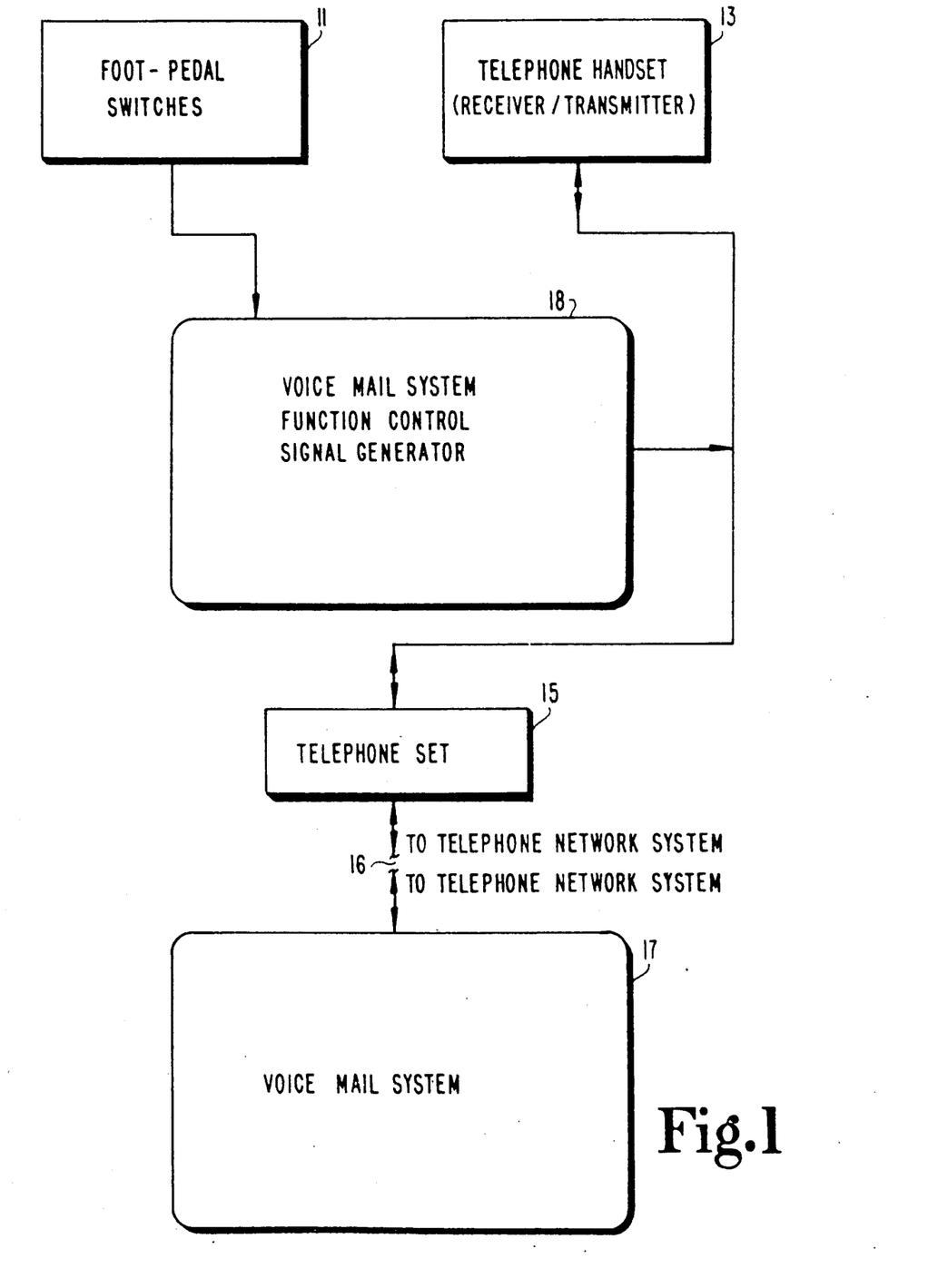
FIG. 1 is a block diagram illustrating the preferred embodiment of the present invention.
Figure 2:
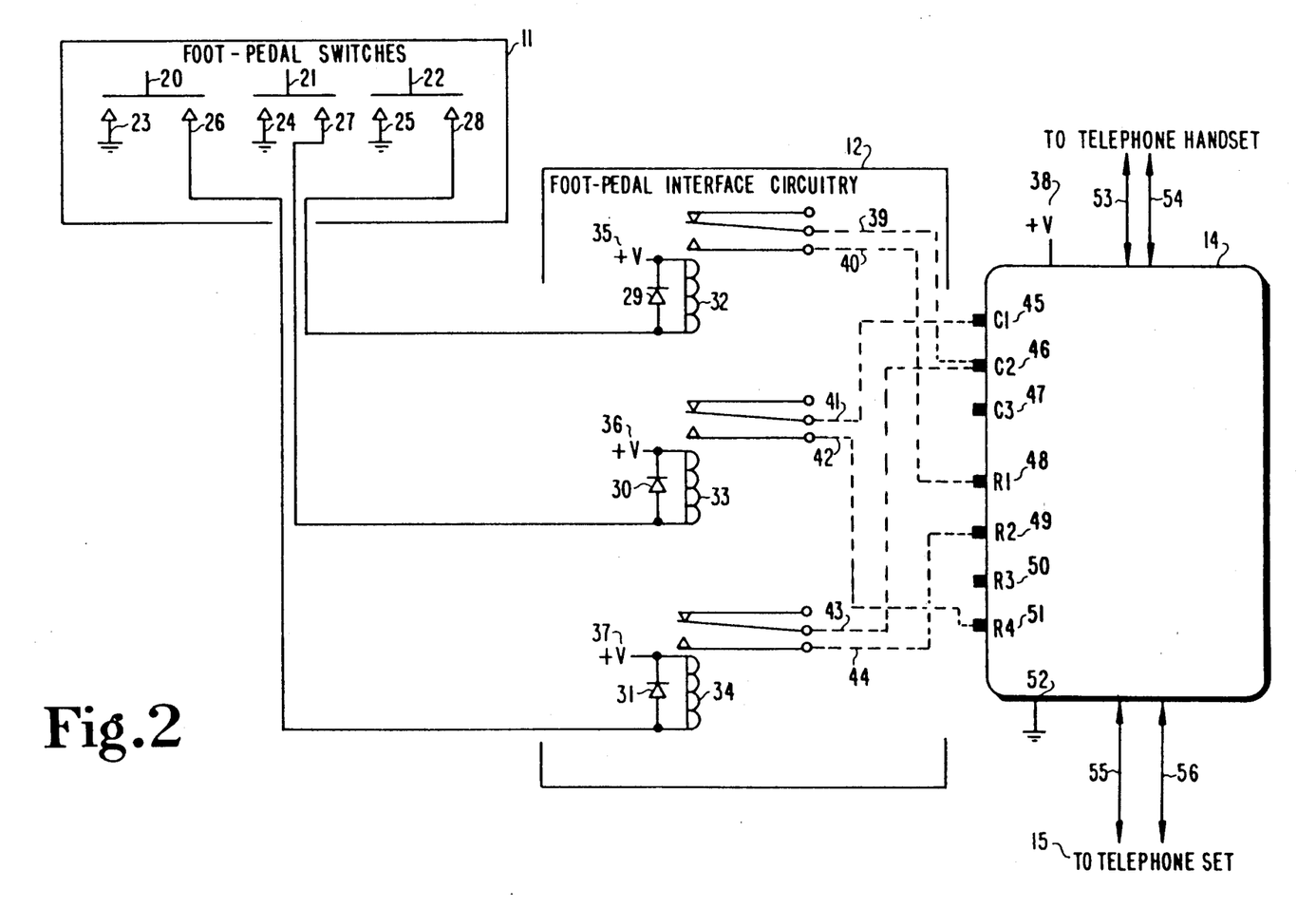
FIG. 2 is a partial schematic of the foot pedal interface circuitry and its connections to the foot pedal switches and DTMF generating and telephone interface circuitry provided for by the preferred embodiment of the present invention.

The preferred embodiment of the present invention enables an operator to control a Voice Mail System (hereinafter referred to as VMS) by a means that frees the user's hands for other tasks. Particularly, and referring to FIG. 1, the preferred embodiment implements the foot pedal 11 control of a VMS 17 by electronically interfacing the foot pedal switches 11 through a voice mail system function control signal generating circuitry 18 which effectively translates, as described hereafter, the actuation of a particular foot pedal to the output of a particular voice mail system control signal which corresponds to a particular voice mail function. In the preferred embodiment the voice mail system function control signal generating circuitry 18 has a foot pedal interface circuitry 12 connected to a dual tone multifrequency (herein referred to as DTMF) tone generator 10 and telephone interface circuitry 14 as shown in FIG. 2. This combined circuitry (i.e. 11, 12 and 14) is electronically coupled together between a telephone set 15 and telephone handset 13 to enable a user through the handset 13 to receive or transmit voice messages or to enable the user by pressing foot pedal 11 to initiate transmission of control tones through any telephone network system 16 that can be used to connect a telephone set 15 to a VMS 17.

The telephone network system 16 used to connect a telephone or telephone like station to a VMS 17 will include but not be limited to a private automatic branch exchange, an electronic automatic private branch exchange, a computerized branch exchange, a private branch exchange, a centrex telephone system, voice connecting arrangements, RS232, RS422, or like digital connecting means between an RS232 type port on a VMS 17 and a digital telephone like station, central off premise telephone switching stations and networks, or any like combination thereof. It is understood that it is contemplated by this invention that the voice mail system function control signal generating means 18 could be connected directly to the VMS without the intermediary of a telephone network.

The foot pedal switch assembly 11 is the preferred embodiment of the activation switch used to obtain "predominantly hands off" control of a VMS 17 while also enabling the user to have "predominantly hands on" control of another process or apparatus such as the keyboard of a typewriter, word processor or the like. Other activation switch embodiments that could replace the foot pedal switch assembly 11 include, but are not limited to the following: a handbar or elbow switch assembly; any other switch that can be controlled by other than the hand with reasonable accuracy; voice activated switch sensors; or activator switches placed directly on the keyboard of a computer used for data entry.

FIG. 2 illustrates a more detailed schematic representation of components provided for by the preferred embodiment of the present invention. Referring to FIG. 2, the telephone interface and DTMF generating circuitry 14 connects in series between a telephone handset 13 and a telephone set 15 through the "tip" (53 and 55) and "ring" (5 and 56) connections normally found between a telephone handset 13 and a telephone set 15.

In the preferred embodiment of the DTMF generating circuitry 14, there are seven terminals which are used to control the generation of DTMF tones. These seven terminals are shown as C1 45, C2 46, C3 47, R1 48, R2 49, R3 50, and R4 51 in FIG. 2 and are named from their association with the three "columns" (C1-C3) and the four "rows" (R1-R4) found on a standard telephone tone dialing keypad. A particular tone is generated when a "row" terminal is directly connected to a "column" terminal. For example, when C1 45 is directly connected to R1 48 then a DTMF tone associated with a "1" on the standard telephone tone dialing keypad is generated and transmitted through the DTMF generation and telephone interface circuitry 14. Similarly, by the appropriate connection of "row" and "column" terminals, all digits including "1", "2", "3", "4", "5", "6", "7", "8", "9", "0", "#", "*" can be generated and transmitted. It is understood that it is contemplated by the present invention that if a VMS is controllable by a digital signal other than a "touch tone," as described, then, the present invention is readily adaptable to generating the necessary digital signals to control the VMS functions in a "hands off" fashion. Instead of a DTMF generator 14, the voice mail system function control signal generating means would include circuitry which generates the appropriate digital signals corresponding to the particular VMS functions to be controlled. The digital signal generating circuitry would be coupled with the foot pedal interface circuitry. In such circumstance, the present invention is directly connectable to the VMS through a RS232 type port or the like in the VMS itself. The digital signals could also be transmitted to the VMS over the telephone network 16.

It is the preferred embodiment of the present invention to make a plurality of combinations of these terminals available to a user through the foot pedal interface circuitry 12. A user can then depress one of the foot pedal switches 20, 21 or 22 in the foot pedal switch assembly 11 and cause a DTMF tone to be generated and transmitted to a telephone set 15. The telephone set 15 is electronically linked to a VMS 17 through a telephone network system 16, so that generated tones will be transmitted from the telephone set 15 through the telephone network system 16 to the VMS 17 to control the various functions available from the VMS 17.

Referring again to FIG. 2, it is the preferred embodiment of the foot pedal interface circuitry 12 to consist of a plurality of relay circuits (29 and 32, 30 and 33, and 31 and 34) each of which causes the closure of an electrical link between user predefined "row" and "column" terminals (45 and 48, 45 and 49, 45 and 50, 45 and 51, 46 and 48, 46 and 49, 46 and 50, 46 and 51, 47 and 48, 47 and 49, 47 and 50, or 47 and 51) when a user depresses a foot pedal switch (20, 21 or 22). The result is the generation of a predefined DTMF control tone required to control a VMS 17 of FIG. 1.

The foot pedal assembly 11 essentially consists of three foot pedal switches: 20, 21 and 22, that each, when depressed by a user, will respectively close a common ground, 23, 24, or 25, to connective wires 26, 27 or 28 to complete the electronic circuit from positive voltage 35, 36 or 37 through each of the respective relay circuits 29 and 32, 30 and 33, or 31 and 34.

Each relay circuit consists of a relay and a diode as exemplified by relay 29 and diode 32. By pressing foot pedal switch 22, the magnetic relay coil contained in relay 32 builds up a magnetic field from the direct current flowing between the positive voltage 35 and ground 25. This magnetic field induced in the relay coil closes the movable contact switch and thereby connects terminals 39 and 40. Then, since terminal 39 will have been previously connected to a "column" type terminal (45, 46 or 47) and terminal 40 will have been connected to a "row" type terminal (48, 49, 50 or 51), the closure of the relay contact will generate and transmit the desired DTMF tone to permit the user the control of the desired VMS function. Since, as exemplified in FIG. 2, terminal 39 is connected to "column" C2 46 and terminal 40 is connected to "row" R1 48, depressing foot pedal switch 20 will generate and transmit a DTMF tone of "2" to a connected VMS. As an example, depending upon the particular VMS, a particular VMS function will be performed by the VMS when it receives a "2" tone. The "2" tone VMS function, for example, is the "skip back to the beginning" of the "oral mail." Since VMS is based upon computer controlled digital storage, the VMS will automatically skip back to the beginning of the "oral mail" as opposed to merely rewinding. Similarly, all other VMS functions can be controlled by assigning activation of a particular foot pedal to the generation of a particular voice mail system tone signal consisting of one or more appropriate tone, tones or sequence of tones and pauses, which signal corresponds to the desired VMS function in the VMS to which the user subscribes.

A typical VMS may have any of the following functions that the user can control through the above-mentioned generation of tones depending upon the correspondence between the tone and the function: Save oral mail, Erase oral mail, backup slightly within the oral mail, backup to the beginning, bookmark a place in the oral mail, go ahead slightly within message, go to the end of this oral mail, scroll forward to the next item of oral mail, scroll backward to the last item of oral mail, "Go to" a particular item of oral mail, Pause while listening to oral mail, call up time and date stamp of the oral mail, play oral mail continuously, adjust listening volume of oral mail, record a greeting, turn off a greeting, record a new item of oral mail, erase a new item of oral mail, archive an item of oral mail, end recording, immediately call the sender of oral mail, forward this oral mail, reply to oral mail, sign off the VMS or "exit", send oral mail with urgent delivery, send oral mail with normal delivery, send oral mail with future delivery, send oral mail with overnight delivery, batch send oral mail, check on oral mail sent, request a "return receipt", broadcast oral mail. Additional VMS functions not listed here are available and others may be introduced in the future.

Similarly, connecting terminals 41, 42, 43 and 44, to particular "column" and "row" terminals will enable a user to depress switches 21 or 22 and generate particular DTMF tones. As exemplified in FIG. 2 switch 21, when depressed, will generate an "*" since terminals 41 and 42 are connected to "column" C1 45 and "row" R4 51, respectively. Similarly, switch 22, when depressed will generate a "5" since terminals 43 and 44 are connected to "column" C2 46 and "row" R2 49, respectively. Thus, by previously defining the terminal connections between terminals 39-44 and terminals 45-51, the user need only depress a particular foot pedal switch to generate a particular DTMF tone. The internal impedance of a relay 32, 33 or 34 must be sufficient to limit the current, otherwise a limiting resistor in series with the respective relay coil must be added to each relay circuit. Each of the diodes 29, 30 and 31 are connected in parallel to the relay coil to suppress voltage spikes generated by the inductive kick produced by the coil.

The DTMF generating circuitry and telephone interface circuitry 14 is powered at terminal 38 with the same voltage source used to power terminal 35, 36 and 37 of the foot pedal interface circuitry 12. Also, the ground terminal 52 has a common connection with the other common ground terminal 23, 24 and 25.

Figures 3, 4:
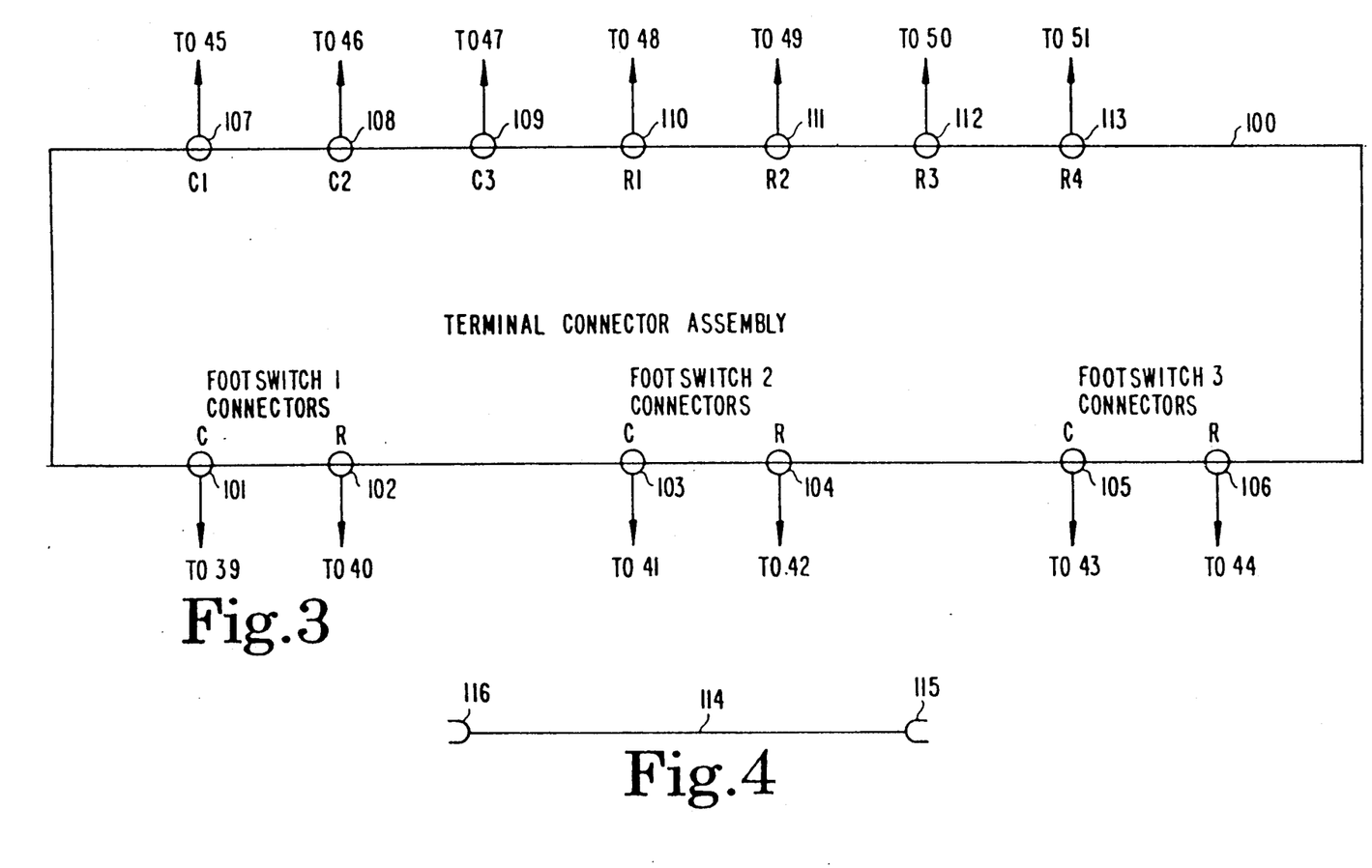
FIG. 3 is a partial schematic of the terminal interface assembly provided for by the preferred embodiment of the present invention.
FIG. 4 is a terminal connector wire for use with the terminal interface assembly of FIG. 3.

FIG. 3 shows the preferred embodiment of terminal connector assembly 100 of the present invention. Terminal connector assembly 100 allows a user to reconfigure any foot pedal switch to select a particular DTMF tone. The simple design of terminal connector assembly 100 and of this invention allows a user, untrained in electronics, to redefine a foot pedal switch to a different DTMF tone without calling in a specially trained technician to reconfigure the foot pedal interface circuitry 50 of FIG. 2.

Foot pedal switch terminals 101, 102, 103, 104, 105 and 106 or FIG. 3, respectively, are shown connected to foot pedal interface terminals 39, 40, 41, 42, 43 and 44 of FIG. 2, respectively. Similarly, terminal connectors 107, 108, 109, 110, 111, 112, 113 of FIG. 3, respectively, are shown connected top the associated DTMF generator terminals 45, 46, 47, 48, 49, 50 and 51 of FIG. 2, respectively. Since each terminal of the terminal connector assembly 100 of FIG. 3 has an adjustable screw, a user can connect both ends of a plurality of conductive "C" ends 115 and 116 of a plurality of terminal connector wires 114 to the proper terminals to complete a "row" or "column" type connection between the foot pedal interface circuitry 12 and the DTMF generation and telephone interface circuitry 14 shown in FIG. 2. An example of a terminal connector wire 114 is shown in FIG. 4.

By using the terminal connector assembly 100 of FIG. 3 with a set of instructions, a user will readily connect a foot pedal switch from the foot pedal interface circuitry 12 of FIG. 2 to the DTMF generating and telephone interface circuitry 14 of FIG. 2 with the relative ease that a speaker is connected to a home stereo system. It is understood that the present invention contemplates that the changing of interconnections could also be done by electronic means such as providing the user with a programmable interface that can be digitally programmed to accomplish a change in pedal to VMS function relationship.

Wherefore, while there have been described above the principals of this invention in connection with specific apparatus and techniques, it is to be clearly understood that this description is made only by way of an example and not as a limitation to the scope of the invention.

I claim:

1. An apparatus for hands off control by a user of an electronic voice mail system comprising:

hands off pedal means having a plurality of pedals and electrical pedal switches, said hands off pedal means being for activating a particular electrical pedal switch corresponding to the activation by a user of a particular pedal;

voice mail system function signal generating means electronically connected to said electrical pedal switches for generating a particular voice mail system control signal corresponding both to the particular electrical pedal switch activated and to a particular voice mail system function;

electronic connection means electronically connecting said voice mail system function signal generating means to a telephone network system for conveying of said particular voice mail system control signal via said telephone network system; and voice mail system means electronically connected to said telephone network system for receiving via said telephone network system said particular voice mail system control signals to perform the voice mail system function corresponding to said particular voice mail system control signal received.

2. An apparatus for hands off control by a user of an electronic voice mail system comprising:

hands off pedal means having a plurality of pedals and electrical pedal switches, said hands off pedal means being for activating a particular electrical pedal switch corresponding to the activation by a user of a particular pedal;

voice mail system function signal generating means electronically connected to said electrical pedal switches for generating a particular voice mail system control signal corresponding to both the particular electrical pedal switch activated and to a particular voice mail system function;

electronic connection means electronically connecting said voice mail system function signal generating means to a telephone network system for conveying of said particular voice mail system control signal via said telephone network system;

said voice mail system function signal generating means having user signal corresponding altering means for changing the particular voice mail system control signal corresponding to a particular electrical pedal switch activated from a first voice mail system control signal corresponding to a particular voice mail system function to one of a plurality of different voice mail system control signals corresponding to one of a plurality of different voice mail system functions; and voice mail system means electronically connected to said telephone network system for receiving via said telephone network system said particular voice mail system control signal to perform the voice mail system function corresponding to said particular voice mail system control signal received.

3. A method for hands off control of a voice mail system by a user comprising the steps of:

(1) electronically connecting voice mail system function signal generating means for generating voice mail system control signals corresponding to voice mail system functions to a voice mail system means via a telephone network system;

(2) electronically connecting (a) hands off pedal means having a plurality of pedals and electrical pedal switches, each of said plurality of pedals operable to enable a corresponding electrical pedal switch, to (b) said voice mail system function signal generating means so that the actuation of any of said electrical pedal switches causes said voice mail system function signal generating means to generate a particular voice mail system control signal corresponding to both said particular electrical pedal switch activated and corresponding to a particular voice mail system function;

(3) choosing a voice mail system function desired by said user;

(4) activating the pedal corresponding to the voice mail system function desired by the user by pressing said pedal; and (5) manually processing oral mail from said voice mail system while repeatedly performing steps 3 and 4.

4. The apparatus of claim 1 wherein said electronic connection means includes a handset connector and a telephone set connector, said electronic connection means being electronically connected to said telephone network system by connected said handset connector to the handset of a telephone set connected to a telephone network system, and by connecting said telephone set connector to said telephone set.

5. The apparatus of claim 4 wherein said signal generating means includes a DTMF integrated circuit directly connected to said hands off pedal means, said integrated circuit monitoring the condition of said pedal switches and supplying the DTMF signals to said electronic connection means for conveyance of closures of said pedal switches.

6. The apparatus of claim 1 wherein said signal generating means includes a DTMF integrated circuit directly connected to said hands off pedal means, said integrated circuit monitoring the condition of said pedal switches and supplying the DTMF signals to said electronic connection means for conveyance through said telephone network system in response to detection of closures of said pedal switches.

7. The apparatus of claim 2 wherein said signal generating means includes a DTMF integrated circuit directly connected to said hands off pedal means, said integrated circuit monitoring the condition of said pedal switches and supplying the DTMF signals to said electronic connection means for conveyance through said telephone network system in response to detection of closures of said pedal switches.

8. The apparatus of claim 2 wherein said electronic connection means includes a handset connector and a telephone set connector, said electronic connection means being electronically connected to said telephone network system by connecting said handset connector to the handset of a telephone set connected to a telephone network system, and by connecting said telephone set connector to said telephone set.

9. The apparatus of claim 1 wherein said particular voice mail system function being at least one of the following voice mail system functions: save oral mail, erase oral mail, backup slightly within the oral mail, backup to the beginning, bookmark a place in the oral mail, go ahead slightly within message, go to the end of this oral mail, scroll forward to the next item of oral mail, scroll backward to the last item of oral mail, "Go to" a particular item of oral mail, pause while listening to oral mail, call up time and date stamp of the oral mail, play oral mail continuously, adjust listening volume of oral mail, record a greeting, turn off a greeting, record a new item of oral mail, erase a new item of oral mail, archive an item of oral mail, end recording, immediately call the sender of oral mail, forward this oral mail, reply to oral mail, sign off the voice mail system, "exit", send oral mail with urgent delivery, send oral mail with normal delivery, send oral mail with future delivery, send oral mail with overnight delivery, batch send oral mail, check on oral mail sent, request a "return receipt", broadcast oral mail.

10. The apparatus of claim 2 wherein said particular voice mail system function being at least one of the following voice mail system functions: save oral mail, erase oral mail, backup slightly within the oral mail, backup to the beginning, bookmark a place in the oral mail, go ahead slightly within message, go to the end of this oral mail, scroll forward to the next item of oral mail, scroll backward to the last item of oral mail, "Go to" a particular item of oral mail, pause while listening to oral mail, call up time and date stamp of the oral mail, play oral mail continuously, adjust listening volume of oral mail, record a greeting, turn off a greeting, record a new item of oral mail, erase a new item of oral mail, archive an item of oral mail, end recording, immediately call the sender of oral mail, forward this oral mail, reply to oral mail, sign off the voice mail system, "exit", send oral mail with urgent delivery, send oral mail with normal delivery, send oral mail with future delivery, send oral mail with overnight delivery, batch send oral mail, check on oral mail sent, request a "return receipt", broadcast oral mail.

11. The apparatus of claim 3 wherein said particular voice mail system function being at least one of the following voice mail system functions: save oral mail, erase oral mail, backup slightly within the oral mail, backup to the beginning, bookmark a place in the oral mail, go ahead slightly within message, go to the end of this oral mail, scroll forward to the next item of oral mail, scroll backward to the last item of oral mail, "Go to" a particular item of oral mail, pause while listening to oral mail, call up time and date stamp of the oral mail, play oral mail continuously, adjust listening volume of oral mail, record a greeting, turn off a greeting, record a new item of oral mail, erase a new item of oral mail, archive an item of oral mail, end recording, immediately call the sender of oral mail, forward this oral mail, reply to oral mail, sign off the voice mail system, "exit", send oral mail with urgent delivery, send oral mail with normal delivery, send oral mail with future delivery, send oral mail with overnight delivery, batch send oral mail, check on oral mail sent, request a "return receipt", broadcast oral mail.

12. An apparatus for hands off control by a user of an electronic voice mail system comprising:

hands off pedal means having a plurality of pedals and electrical pedal switches, said hands off pedal means being for activating a particular electrical pedal switch corresponding to the activation by a user of a particular pedal;

voice mail system function signal generating means electronically connected to said electrical pedal switches for generating a particular DTMF voice mail system control signal corresponding to the particular electrical pedal switch activated; and voice mail system means for receiving said particular DTMF voice mail system control signal to perform voice mail system functions corresponding to said particular DTMF voice mail system control signal received, said voice mail system means being electronically connected to said voice mail system function signal generating means via a telephone network system to receive said particular DTMF voice mail system control signal.

13. An apparatus for hands off control by a user of an electronic voice mail system comprising:

hands off pedal means having a plurality of pedals and electrical pedal switches, said hands off pedal means being for activating a particular electrical pedal switch corresponding to the activation by a user of a particular pedal;

voice mail system function signal generating means electronically connected to said electrical pedal switches for generating a particular DTMF voice mail system control signal backup to the beginning, bookmark a place in the oral mail, go ahead slightly within message, go to the end of this oral mail, scroll forward to the next item of oral mail, scroll backward to the last item of oral mail, "Go to" a particular item of oral mail, pause while listening to oral mail, call up time and date stamp of the oral mail, play oral mail continuously, adjust listening volume of oral mail, record a greeting, turn off a greeting, record a new item of oral mail, erase a new item of oral mail, archive an item of oral mail, end recording, immediately call the sender of oral mail, forward this oral mail, reply to oral mail, sign off the voice mail system, "exit", send oral mail with urgent delivery, send oral mail with normal delivery, send oral mail with future delivery, send oral mail with overnight delivery, batch send oral mail, check on oral mail sent, request a "return receipt", broadcast oral mail; and voice mail system means for receiving said particular voice mail system control signal to perform the voice mail system function corresponding to said particular voice mail system control signal received, said voice mail system means being electronically connected to said voice mail system function signal generating means to receive said voice mail system control signal.

* * * * *

UNITED STATES PATENT AND TRADEMARK OFFICE
CERTIFICATE OF CORRECTION

PATENT NO. : 5,048,074

DATED : September 10, 1991

INVENTOR(S) : William P. Dugdale

It is certified that error appears in the above-identified patent and that said Letters Patent is hereby corrected as shown below:

Column 5, line 55, change "(5" to --(54--.

Column 8, Claim 1, line 65, change "signals" to --signal--.

Column 9, Claim 2, line 20, change "corresponding" to --correspondence--.

Column 9, Claim 4, line 67, change "connected" to --connecting--.

Column 10, Claim 5, line 8, after "conveyance" add the following:

--through said telephone network system in response to detection--.

UNITED STATES PATENT AND TRADEMARK OFFICE
CERTIFICATE OF CORRECTION

PATENT NO. : 5,048,074

DATED : September 10, 1991

INVENTOR(S) : William P. Dugdale

It is certified that error appears in the above-identified patent and that said Letters Patent is hereby corrected as shown below:

Column 10, Claim 6, line 14, delete "the".

Column 10, Claim 7, line 22, delete "the".

Column 12, Claim 13, line 15, delete "DTMF".

Col. 12, Claim 13, line 16, after the word "signal" insert the following:

--corresponding both to the particular electrical pedal switch activated and to a particular voice mail system function;

said particular voice mail system function being at least one of the following voice mail system functions: save oral mail, erase oral mail, backup slightly within the oral mail,--.

Signed and Sealed this

Twenty-second Day of December, 1992

*Attest:*

DOUGLAS B. COMER

*Attesting Officer*   *Acting Commissioner of Patents and Trademarks*